United States Patent [19]

Hosaka et al.

[11] Patent Number: 4,555,691
[45] Date of Patent: Nov. 26, 1985

[54] SHIFT INDICATING SYSTEM FOR SPEED CHANGE GEARS OF A MANUAL TRANSMISSION

[75] Inventors: Takefumi Hosaka, Asaka; Takeshi Imai, Tokyo; Takaya Senzaki, Iruma, all of Japan

[73] Assignee: Honda Giken Kogyo Kabushiki Kaisha, Tokyo, Japan

[21] Appl. No.: 428,710

[22] Filed: Sep. 30, 1982

[30] Foreign Application Priority Data

Dec. 4, 1981 [JP] Japan ................................ 56-196092

[51] Int. Cl.$^4$ ............................ G09B 9/04; B60Q 1/26
[52] U.S. Cl. ................................ 340/52 R; 340/52 D; 340/62; 434/71; 74/DIG. 7
[58] Field of Search .................... 340/52 R, 52 D, 53, 340/62, 669, 670; 180/171; 74/336 R, DIG. 7, 855; 200/61.88; 324/161; 364/424.1, 442; 434/71; 73/117.3

[56] References Cited

U.S. PATENT DOCUMENTS

| | | | |
|---|---|---|---|
| 3,925,753 | 12/1975 | Auman et al. | 340/52 R |
| 3,983,533 | 9/1976 | Goszyk et al. | 340/52 R |
| 4,016,536 | 4/1977 | La Chapelle | 340/62 |
| 4,438,423 | 3/1984 | Stier | 340/52 R |
| 4,439,158 | 3/1984 | Weber | 434/71 |

Primary Examiner—John W. Caldwell, Sr.
Assistant Examiner—Ellwood G. Harding
Attorney, Agent, or Firm—Armstrong, Nikaido, Marmelstein & Kubovcik

[57] ABSTRACT

A shift-up indicating system for manual speed change gears of an automobile transmission wherein preset values are respectively provided for the speed of the automobile, the engine speed of the engine and the vacuum pressure of the engine to determine a region of running conditions which can provide a good fuel consumption for every shift position of the speed change gears such that when a driver selects one of the predetermined gear positions of the speed change gears, if the condition of fuel consumption is brought out of the determined region, then an indication is given to the driver by an illuminating indicator to thereby urge the driver to shift up the speed change gears to a higher gear.

8 Claims, 3 Drawing Figures

SHIFT INDICATING SYSTEM FOR SPEED CHANGE GEARS OF A MANUAL TRANSMISSION

BACKGROUND OF THE INVENTION

1. Field of the Invention

This invention relates to a shift indicating system for speed change gears of a manually operated automobile transmission.

2. Description of the Prior Art

During driving of an automobile having manually operated speed change gears, if a driver is not given information regarding whether fuel consumption of the automobile is good or not, then the driver normally shifts the speed change gears and operates an accelerator pedal suitably in accordance with a speed of the automobile depending upon a driving sense based on the experience of the driver himself or herself. Accordingly, it is very difficult for a driver to drive an automobile under a condition of optimum fuel consumption in which fuel consumption is maintained at the minimum. It is of course preferable to drive an automobile with a good fuel consumption from the point of view of improving the economy of the automobile. In order to resolve this problem, it may be desired that, during driving, a driver be informed of whether or not the automobile is running in a condition of optimum fuel consumption and that the driver be instructed to effect a shifting operation between different speed positions of a speed change gear if the automobile is operating with bad fuel consumption. If the driver is thus given information regarding whether the fuel consumption is good or not and an instruction to effect a speed change shifting operation in accordance with such information, then the driver will drive the automobile in accordance with the information and the instruction in such a manner than an efficient fuel consumption may be maintained.

In view of these circumstances, several indicating devices have been proposed by which a driver can drive an automobile while maintaining a desired fuel consumption. But, there is not as yet a device than can substantially meet the following requirements: that information regarding fuel consumption is highly reliable; that production cost is very low; that is simple in construction and the reliability of operation is high; that can provide an indication which is easy for a driver to optically notice during driving and from which the driver can easily determine the shifting operation which the driver should effect.

SUMMARY OF THE INVENTION

According to the present invention, there is provided a shift indicating system for a manually operated speed change gear of an automobile transmission, characterized in that it comprises a car speed detector for detecting when the speed of the automobile is higher than a preset speed, an engine speed detector for detecting when the engine speed of the engine of the automobile is higher than a preset engine speed, a plurality of various circuit elements operable to provide an output signal for prohibiting an indication that fuel consumption is bad, and an indicator element which is illuminated to indicate that fuel consumption is bad. The system circuit operates such that the indicator element is illuminated only when the respective speeds detected by the car speed detector and the engine speed detector meet the respective above defined conditions and these detectors thereby provide output signals and when neither of the various circuit elements provides an output signal.

An object of the present invention resides in the provision of a shift indicating system for a manually operated speed change gear of an automobile transmission wherein a driver can be easily and accurately informed whether fuel consumption is good or not so that the driver may effect an appropriate shifting operating of the speed change gear in accordance with an indication of the system.

Another object of the present invention is to provide a shift indicating system which is simple in construction, and which can be produced at an inexpensive cost and is highly reliable in operation.

DETAILED DESCRIPTION OF THE INVENTION

Figure 1:
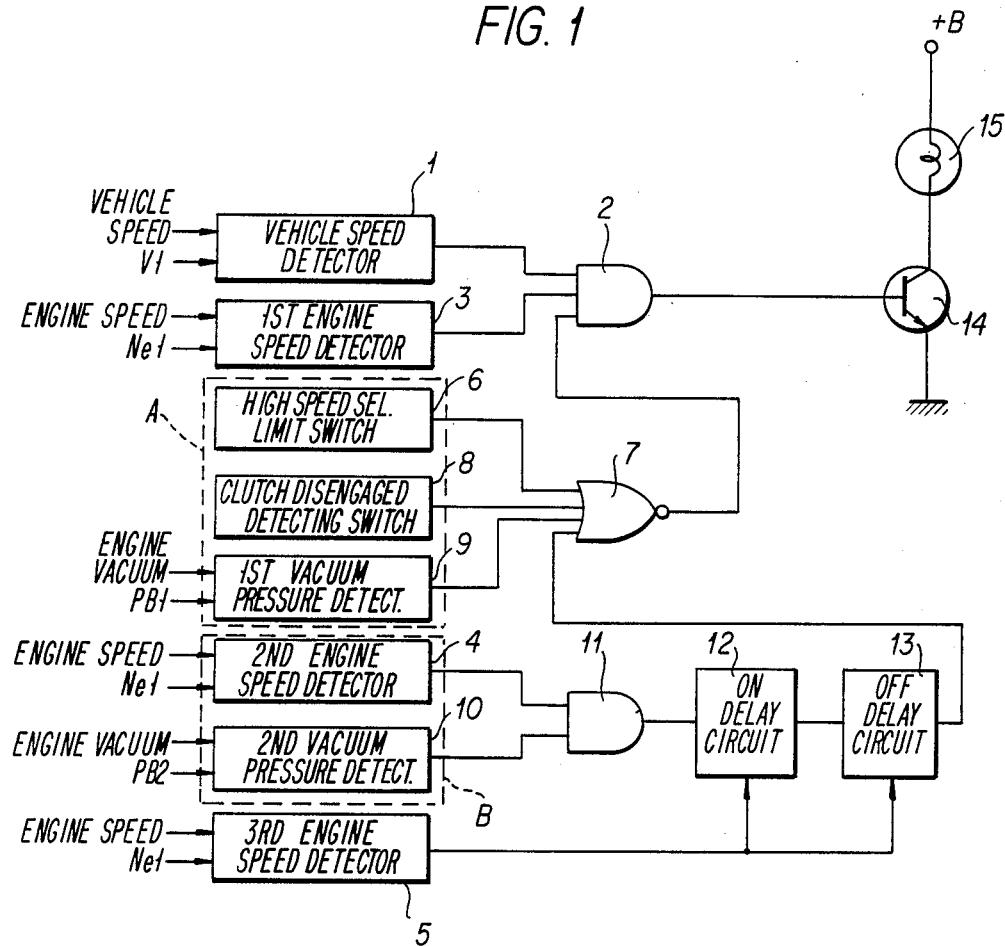
FIG. 1 is a circuit diagram of a shift indicating system for a manual speed change gear of an automobile transmission according to the present invention.

Referring first to FIG. 1, there is illustrated a circuit construction of a shift indicating system for a manual speed change gear of an automobile transmission according to the present invention.

The circuit includes a speed detector 1 in which the actual speed of the automobile is compared with a preset car speed V1. The speed detector 1 provides an output signal of a high level voltage (hereinafter denoted as "1") when the actual speed of the automobile is higher than the preset car speed V1 whereas it outputs a signal of a low level voltage (hereinafter denoted as "0") when the actual car speed is lower than the preset car speed V1. The output signal of the speed detector 1 is connected to an AND circuit 2.

The circuit further includes an engine speed detector 3 in which the acutal engine speed of an engine (not shown) is compared with a preset engine speed Ne1. The engine speed detector 3 outputs "1" when the actual engine speed of the engine is higher than the preset value Ne1 whereas it outputs "0" when the actual engine speed is lower than the preset value Ne1. Another engine speed detector 4 is also provided which operates in a similar manner to the engine speed detector 4. While the embodiment includes the second engine speed detector 4 in addition to the first engine speed detector 3, it is also possible to use an output of the first detector 3 instead of the second engine speed detector 4. The output signal of the detector 4 is applied to an AND circuit 11. A further engine speed detector 5 is also provided, in which an actual engine speed of the engine is compared with the preset engine speed Ne1. The detector 5, however, outputs "1" when an actual engine speed of the engine is lower than the preset value Ne1 whereas it outputs "0" when an actual engine speed is higher than the preset value Ne1. However, it is also possible to otherwise incorporate a NOT circuit connected to the output of the detector 3 or 4 instead of the detector 5.

The circuit further includes a limit switch 6 for detecting when the speed change gear is in the high speed shift position, that is, in the fifth speed shift position in the preferred embodiment. The switch 6 turns on to output a signal "1" when the speed change gear is shifted to the fifth speed position whereas it remains off to output a signal "0" when the speed change gear is in a position other than the fifth speed position. An output of the shift switch 6 is connected to a NOR circuit 7.

The circuit also includes a clutch disengagement detecting switch 8 which remains in an off position to output "0" when a clutch (not shown) is in an engaged position whereas it is turned on to output "1" when the clutch is in a disengaged position. The clutch switch 8 is provided in order to prohibit indication regarding whether or not the current fuel consumption is in a desired condition when the clutch is not in its engaged position and thus the automobile is not in a regular running condition, such as, for example, when an accelerator pedal (not shown) is pushed down to rev the engine while idling. The output signal of the clutch switch 8 is also connected to the NOR circuit 7.

The circuit further includes a first vacuum pressure detector (engine booster pressure detector) 9 in which the actual vacuum pressure of the engine is compared with a preset vacuum pressure PB1. The vacuum pressure detector 9 outputs "1" when an actual vacuum pressure is higher than the preset value PB1 whereas it outputs "0" when an actual vacuum pressure is lower than the preset value PB1. The output signal of the vacuum pressure detector 9 is also applied to the NOR circuit 7. A second vacuum pressure detector 10 is also provided in which the actual vacuum pressure of the engine is compared with another preset vacuum pressure PB2. The vacuum pressure detector 10 outputs "1" when the actual vacuum pressure of the engine is below the preset value PB2. The output signal of the vacuum pressure detector 10 is applied to an AND circuit 11.

In the above described circuit, a circuit section A including the switches 6 and 8 and the detector 9 is provided to prohibit an indication of shifting of the manual speed change gear to the high speed position even if the fuel consumption is poor when all of the switches 6 and 8 and the detector 9 output a signal "1" in accordance with the predetermined conditions as described above. When the automobile is operated under such predetermined conditions, it is not so significant if running conditions do not assure a desired fuel consumption, and normally there is no need of informing a driver of it every time fuel consumption enters into this undesired condition.

Further, a circuit section B of the above described circuit which includes the detectors 4 and 10 is provided to prohibit an indication of poor fuel consumption or for shifting up when the car is running up slowly along a long slope. An output signal of the circuit section B is delivered to the NOR circuit 7 through the AND circuit 11, an on delay circuit 12 and an off delay circuit 13. The delay time of the on delay circuit 12 and the off delay circuit 13 is selected to be on the order of 5 seconds. Operation of the on delay circuit 12 and the off delay circuit 13 can be cleared by an output signal "1" from the engine speed detector 5.

Figure 2:
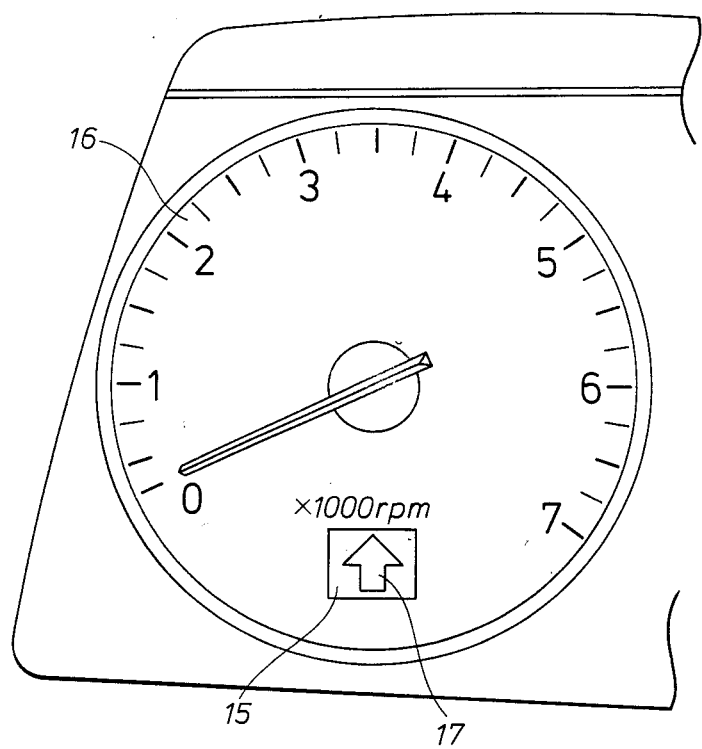
FIG. 2 is a view showing an exemplary form of an indicator element.

An output signal of the NOR circuit 7 is applied to the AND circuit 2 which has an output connected to the base of a transistor 14. An indicator element 15 is connected between the collector of the transistor 14 and a power source terminal +B through a resistor (not shown), and the emitter of the transistor 14 is substantially grounded. An exemplary form of indication of the indicator element 15 is shown in FIG. 2. The indicator element 15 is provided in a tachometer 16 which can be easily viewed by a driver. If a logical signal "1" is received by the transistor 14, then the indicator 15 is illuminated to indicate an undesirable fuel consumption so that the driver is stimulated to shift up the speed change gear by an arrow mark 17 of the indicator element 15.

Figure 3:
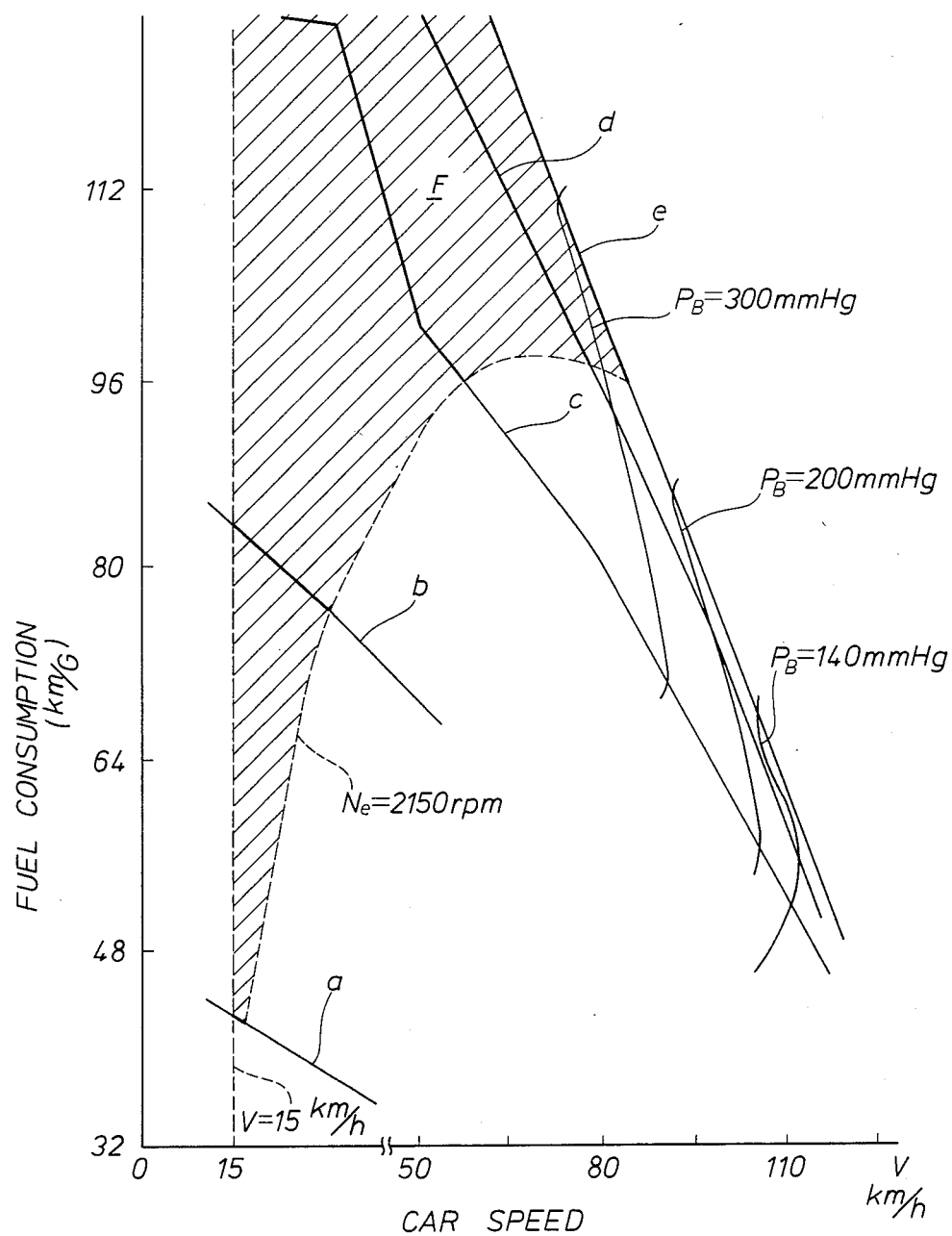
FIG. 3 is a diagrammatic representation showing a region providing good fuel consumption which is taken into consideration when preset values are to be determined for use with the present invention.

Preferred examples of preset values V1, PB1, Ne1 and PB2 of the above described detectors 1, 3, 4, 5, 9 and 10 are illustrated in FIG. 3. In the following, the meanings of such values are clearly described and the general operation of the above described shift indicating system is also described.

FIG. 3 is a diagrammatic representation illustrating relationships of individual shift positions of the speed change gear to the car speed V, the vacuum pressure PB and the engine speed Ne. In this figure, the abacissa denotes the car speed V and the ordinate denotes the fuel consumption. A shaded section F of FIG. 3 shows an area in which fuel consumption is good, and this section is an area which is determined, for example, by the conditions V>15 km/h, 140 mmHg<PB>550 mmHg and Ne<2150 r.p.m. In FIG. 3, lines a, b, c, d and e represent the relationship of the car speed to the fuel consumption for the five shift positions of the manual speed change gear and are thus diagrams for the first, the second, the third, the fourth and the fifth position, respectively. The area F in which fuel consumption is good as described above is significant only in connection with the lines a–e for the respective shift positions. In particular, only in thick line portions of the lines a, b, c, d and e which are included in the area F, are the running conditions of the automobile for the respective shifts positions such that fuel consumption is good.

In order to maintain the fuel consumption of the automobile in a good condition during driving, when one of the shift positions from the first to the fourth of the speed change gear is to be selected, it is desirable for a driver to shift the speed change gear to a selected position such that the selected shift position is included in the above described area F. Accordingly, it is considered that, if running conditions for a shift position of the speed change gear which is selected during driving are brought out of the area F, then an indicator is illuminated to indicate to the driver to shift up the speed change gear whereby the driver may effect a shifting operation of the speed change gear in accordance with the indication.

Now, provided that V1=15 km/h, PB1=550 mmHg, PB2=140 mmHg and Ne1=2150 r.p.m., then the output of the AND circuit 2 is "1" only if the car speed during running at any one of the first to fourth shift positions of the speed change gear is higher than 15 km/h, the engine speed is higher than 2150 r.p.m., the switches 6, 8 are in their off position, the vacuum pressure is lower than 500 mmHg and the output of the off delay circuit 13 is "0". If the AND circuit 2 thus outputs "1", then the transistor 14 turns on to cause the indicator element 15 to be illuminated with the arrow mark 17 to notify the driver that the fuel consumption is poor thereby urging the driver to shift up the position of the speed change gear. Thus, if the driver shifts up the position of the speed change gear in accordance with an instruction of the indicator element 15, then the running conditions causing poor fuel consumption as described above are removed and the indicator element 15 is extinguished.

The vacuum pressure detector 9 also serves as a detector which detects that a vehicle is running in a decelerating condition and is thus provided in order to prohibit the indicator element 15 from being illuminated during deceleration of the car.

As apparent from the foregoing description, according to the present invention, an indicator element is illuminated to inform a driver when the fuel consumption is poor mainly during acceleration and running along the streets, thereby urging the driver to effect a shifting up operation. The driver can then shift the speed change gear to cause the indicator element to indicate that the fuel consumption is good whereby the fuel consumption can be improved. Also, according to the invention, a shift indicating system for the speed change gear can be provided which can be constructed extremely easily, hence produced at a low cost, and which seldom suffers from problems and hence is highly reliable in operation. Particularly, since the present invention employs an illuminating type indication for indicating poor fuel consumption by an indicator element, various highly practical advantages are provided thereby, such as, for example, that the driver can easily become aware of such an indication.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are, therefore, to be embraced therein.

What is claimed is:

1. A shift-up indicating system for manual speed change gears of a automobile transmission, said system comprising:
   (a) car speed detector means for detecting a vehicle speed condition when the speed of an automobile is greater than a predetermined vehicle speed and for producing an output voltage level indicative of said condition;
   (b) engine speed detector means for detecting an engine speed condition when the speed of an engine of said automobile is greater than a predetermined engine speed and for producing an output voltage level indicative of said condition;
   (c) circuit means for monitoring the occurrence of at least one predetermined operating condition of said automobile during the occurrence of which said at least one predetermined operating condition an indication to a driver of said automobile of a condition of poor fuel consumption is not required, and for producing an output voltage level when said at least one predetermined operating condition occurs; and
   (d) indicator means operably coupled to said car speed detector means, said engine speed detector means and said circuit means, for producing an indication of an operating condition of poor fuel consumption when said output voltage levels of said car speed detector means and said engine speed detector means indicate that the automobile and engine speeds are greater than the respective predetermined vehicle speed and predetermined engine speed and when the output voltage level of said circuit means indicates that none of said at least one predetermined operating condition of said automobile has occurred.

2. A shift-up indicating system as set forth in claim 1 wherein said circuit means includes shift switch means for providing an output voltage level indicating when said speed change gears are shifted to a highest gear.

3. A shift-up indicating system as set forth in claim 1 wherein said circuit means includes clutch switch means for providing an output voltage level indicating when a clutch of said automobile is disengaged.

4. A shift-up indicating system as set forth in claim 1 wherein said circuit means includes a first vacuum pressure detector means for providing an output voltage level indicating when a vacuum pressure of said engine is higher than a preset value.

5. A shift-up indicating system as set forth in any of claims 1, 2, 3, or 4 wherein said circuit means includes second engine speed detector means, second vacuum pressure detector means and AND circuit means, inputs of said AND circuit means being respectively coupled to outputs of said second engine speed detector means and said second vacuum pressure detector means.

6. A shift-up indicating system as set forth in claim 1 wherein said indicator means includes a visual indicator.

7. A shift-up indicating system as set forth in claim 6 wherein said visual indicator is arrow shaped and is illuminated for indicating said operating condition of poor fuel consumption.

8. A shift-up indicating system as set forth in claim 6 wherein said visual indicator is positioned on a tachometer of said automobile.

* * * * *